Dec. 30, 1930.                J. J. VANHORN                1,786,795
                        RAILWAY TRAIN INDICATING APPARATUS
                              Filed Oct. 9, 1929
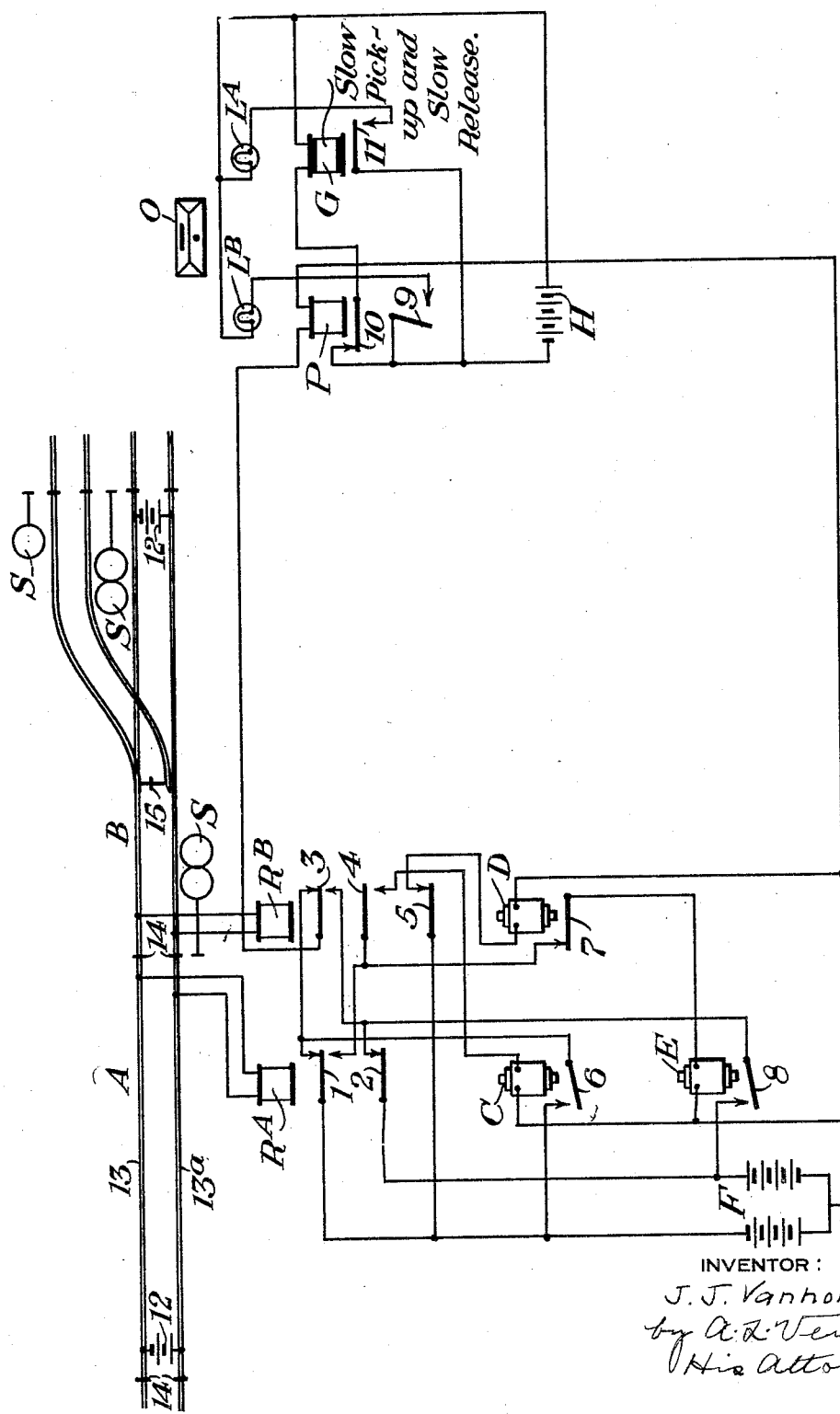
INVENTOR:
J. J. Vanhorn,
by A. L. Vencill,
His Attorney Patented Dec. 30, 1930

1,786,795

UNITED STATES PATENT OFFICE

JAMES J. VANHORN, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY-TRAIN-INDICATING APPARATUS

Application filed October 9, 1929. Serial No. 398,312.

My invention relates to railway train indicating apparatus, and particularly to apparatus for indicating, at one point such as a despatcher's office, the presence and absence of trains on a track at a distant point.

One feature of my invention is the provision of novel and improved means for accomplishing this result with a minimum number of line wires between the track and the despatcher's office.

I will describe one form of apparatus embodying my invention, and will then point out the novel features thereof in claims.

The accompanying drawing is a diagrammatic view showing one form of apparatus embodying my invention.

Referring to the drawing, the reference characters 13 and $13^a$ designate the track rails of a railway, which rails are divided by insulated joints 14 to form two adjoining sections A and B. Section B is provided with a switch 15 and with signals S governing traffic over this switch, which switch and signals are controlled from a distant point, such as a despatcher's office O, through the medium of apparatus which forms no part of my present invention. Because of this control, however, it becomes important for the despatcher to know the conditions of track sections A and B, and the purpose of my invention is the provision of means for giving him this information.

Track section A is provided with a track circuit comprising a track battery 12, and a track relay $R^A$, and track section B is provided with a similar track circuit including a track battery 12 and a track relay $R^B$. Associated with the track relays $R^A$ and $R^B$, are three slow-releasing relays C, D and E. Relay D is provided with a circuit which passes from the left-hand terminal of a battery F, through front contact 5 of track relay $R^B$, and the winding of relay D to the middle point of battery F. It follows that this relay is energized or de-energized accordingly as track relay $R^B$ is closed or open. Relay C is provided with a circuit which passes from the left-hand terminal of battery F, through back contact 1 of relay $R^A$, back contact 4 of relay $R^B$ and the winding of relay C to the middle point of battery F. It follows that relay C is de-energized when either track relay is closed, but is energized when both track relays are open. Relay E is provided with a circuit which passes from the left-hand terminal of battery F, through back contact 1 of track relay $R^A$, front contact 7 of relay D, and the winding of relay E to the middle point of battery F. It follows that relay E is normally de-energized, but becomes energized when relay D is closed and relay $R^A$ is open.

Located at the despatcher's office O is a polarized relay P, which is controlled by the aforesaid track relays and slow-releasing relays in a manner which will be explained hereinafter. Also located in the despatcher's office is a relay G characterized by the fact that it is slow in picking up and also slow in releasing. Relay G is provided with a circuit which includes a battery H and a front neutral contact 10 of relay P. The despatcher's office is provided with two indicators $L^A$ and $L^B$ for track sections A and B, respectively, which indicators, as here shown, are electric lamps. Lamp $L^A$ is provided with a circuit which includes battery H and a back contact 11 of relay G, so that this lamp is lighted when relay G is open. Lamp $L^B$ is provided with a circuit which includes battery H and a polar contact 9 of relay P, which contact is closed when the relay is energized by current of reverse polarity. Relay P is characterized by the fact that when the relay becomes de-energized its polar contact 9 remains in the position to which it was last moved.

Normally both track relays $R^A$ and $R^B$ are closed, and under this condition current of normal polarity is supplied to polarized relay P, the circuit being from the left-hand terminal of battery F, through front contact 1 of relay $R^A$, front contact 3 of relay $R^B$, and the winding of polarized relay P to the middle point of battery F. Contact 9 of relay P is therefore open, so that lamp $L^B$ is extinguished. Relay G is closed, so that its back contact 11 is open and lamp $L^A$ is extinguished. Slow-releasing relay D is closed, but both relays C and E are open.

When a train enters section A, it will open track relay $R^A$, thereby opening the circuit just traced for relay P, so that the neutral contact 10 of the latter relay will open. This will de-energize relay G, with the result that lamp $L^A$ will become lighted to indicate that track section A is occupied. The opening of track relay $R^A$ will close at back contact 1 the circuit for the slow-releasing relay E, so that this relay will become energized.

When the front end of the train enters section B, it will open track relay $R^B$, with the result that both track relays will be open, and so the circuit for slow-releasing relay C will be closed at back contacts 1 and 4 of these relays. The circuit for relay D will be opened at contact 5 of track relay $R^B$, so that after a given interval of time relay D will open, and after a further given interval of time relay E will open. While relay E is closed, however, polarized relay P will be supplied with current of reverse polarity, the circuit being from the right-hand terminal of battery F, through contact 8 of relay E, back contact 3 of relay $R^B$, and the winding of relay P to the middle point of battery F. This will cause contact 9 of relay P to close, thereby lighting lamp $L^B$ to indicate that track section B has become occupied. As soon as relay E opens, relay P will become de-energized, but its contact 9 will remain closed, and, consequently both of the lamps $L^A$ and $L^B$ will be lighted. The circuit for relay G will be closed while relay P is energized, but due to the slow pick-up characteristic of relay G its back contact 11 will not open and so lamp $L^A$ will not be affected.

When the rear end of the train passes out of the section A, track relay $R^A$ will close. Relay P will again be supplied with current of reverse polarity, the circuit being from the right-hand terminal of battery F, through front contact 2 of relay $R^A$, back contact 3 of relay $R^B$ and the winding of relay P to the middle point of battery F. This will cause relay P to again be energized in the reverse direction, and the closing of neutral contact 10 will after an interval of time cause relay G to become energized. Lamp $L^A$ will then be extinguished to indicate that track section A is unoccupied. When the train leaves section B, track relay $R^B$ will close, so that relay P will again be supplied with current of normal polarity, through front contacts 1 and 3 of the track relays, with the result that lamp $L^B$ will be extinguished.

I will now assume that both sections A and B are unoccupied, and that a train enters section B. Current of reverse polarity will then be supplied to relay P, through front contact 2 of relay $R^A$ and back contact 3 of relay $R^B$, so that contact 9 of relay P will close to cause lamp $L^B$ to become lighted. Relay D will become de-energized, but relays C and E will not be affected. When the front end of the train enters section A, it will open relay $R^A$. The opening of relay $R^A$ will open the circuit for relay P, so that relay G will become de-energized, with the result that both lamps $L^A$ and $L^B$ will be lighted. Relay C will become energized because back contacts 1 and 4 of the track relays are both closed. When the rear end of the train passes out of section B, track relay $R^B$ will close, and relay C being closed, current of normal polarity will be supplied to relay P, through front contact 6 of relay C and front contact 3 of relay $R^B$. This circuit will be closed, however, only during the short interval of time between the closing of relay $R^B$ and the release of relay C. During this interval, relay P will be energized in the normal direction to open its contact 9, and so extinguish lamp $L^B$, whereafter relay C will remain de-energized to keep lamp $L^A$ lighted. When the train passes out of section A, track relay $R^A$ will close to restore the apparatus to its normal position.

I will now assume that two trains enter sections A and B at the same instant, so that track relays $R^A$ and $R^B$ are opened simultaneously. Relay D being closed, the opening of track relay $R^A$ will cause relay E to become energized, and the opening of both track relays will, of course, cause relay C to become energized. The result of this is, that all three slow-releasing relays C, D and E will be closed, but that relay D will open after a given time interval and relay E will open after a further given time interval. While relay E is closed, current of reverse polarity will be supplied to the relay P, through front contact 8 of relay E and back contact 3 of relay $R^B$, so that contact 9 of relay P will become closed to light lamp $L^B$. After relay E opens, this circuit for relay P will become opened, so that relay G will be de-energized and will cause lamp $L^A$ to be lighted. Both lamps will then be lighted to indicate that both track sections A and B are occupied.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, two sections A and B of railway track, track circuits including track relays $R^A$ and $R^B$ for said two sections respectively, three slow-releasing relays C, D and E, a circuit for relay C including a back contact of relay $R^A$ and a back contact of relay $R^B$ in series, a circuit for relay D including a front contact of relay $R^B$, a circuit for relay E including a back contact of relay $R^A$ and a front contact of relay D in series, a polarized relay P, a circuit for relay P including a source of current of normal polarity and a front contact of each relay $R^A$ and $R^B$ in series, a branch for said circuit around the front contact of relay $R^A$ and including a front contact of relay C, a second circuit for relay P including a source of current of reverse polarity as well as a front contact of relay $R^A$ and a back contact of relay $R^B$ in series, a branch for said second circuit around the front contact of relay $R^A$ and including a front contact of relay E, and indicating means controlled by said polarized relay P.

2. In combination, two sections A and B of railway track, track circuits including track relays $R^A$ and $R^B$ for said two sections respectively, three slow-releasing relays C, D and E, a circuit for relay C including a back contact of relay $R^A$ and a back contact of relay $R^B$ in series, a circuit for relay D including a front contact of relay $R^B$, a circuit for relay E including a back contact of relay $R^A$ and a front contact of relay D in series, a polarized relay P, a circuit for relay P including a source of current of normal polarity and a front contact of each relay $R^A$ and $R^B$ in series, a branch for said circuit around the front contact of relay $R^A$ and including a front contact of relay C, a second circuit for relay P including a source of current of reverse polarity as well as a front contact of relay $R^A$ and a back contact of relay $R^B$ in series, a branch for said second circuit around the front contact of relay $R^A$ and including a front contact of relay E, a slow pick-up and slow-release relay G controlled by a neutral contact of relay P, two indication devices $L^A$ and $L^B$ for said two track sections A and B respectively, a circuit for lamp $L^A$ controlled by a back contact of relay G, and a circuit for lamp $L^B$ controlled by a reverse contact of relay P.

3. In combination, two sections A and B of railway track, track circuits including track relays $R^A$ and $R^B$ for said two sections respectively, three slow-releasing relays C, D and E, a circuit for relay C including a back contact of relay $R^A$ and a back contact of relay $R^B$ in series, a circuit for relay D including a front contact of relay $R^B$, a circuit for relay E including a back contact of relay $R^A$ and a front contact of relay D in series, a polarized relay P, a circuit for relay P including a source of current of normal polarity and a front contact of each relay $R^A$ and $R^B$ in series, a branch for said circuit around the front contact of relay $R^A$ and including a front contact of relay C, a second circuit for relay P including a source of current of reverse polarity as well as a front contact of relay $R^A$ and a back contact of relay $R^B$ in series, a branch for said second circuit around the front contact of relay $R^A$ and including a front contact of relay E, two indication devices $L^A$ and $L^B$ for said track sections A and B respectively, means for operating device $L^A$ when relay P is de-energized, and means for operating device $L^B$ when a reverse contact of relay P is closed.

4. In combination, two sections A and B of railway track, track circuits for said sections including track relays $R^A$ and $R^B$ respectively, a polarized relay P, means for supplying said relay P with current of normal polarity when both of said track relays are energized, means for supplying relay P with current of reverse polarity when relay $R^A$ is energized and relay $R^B$ is de-energized, means for de-energizing relay P when relay $R^A$ is de-energized and relay $R^B$ is energized, and indicating means for said track sections controlled by said relay P.

5. In combination, two sections A and B of railway track, track circuits for said sections including track relays $R^A$ and $R^B$ respectively, a polarized relay P, means for supplying said relay P with current of normal polarity when both of said track relays are energized, means for supplying relay P with current of reverse polarity when relay $R^A$ is energized and relay $R^B$ is de-energized, means for de-energizing relay P when relay $R^A$ is de-energized and relay $R^B$ is energized, a slow pick-up and slow release relay G controlled by a neutral contact of relay P, two indication devices $L^A$ and $L^B$ for said two track sections A and B respectively, a circuit for lamp $L^A$ controlled by a back contact of relay G, and a circuit for lamp $L^B$ controlled by a reverse contact of relay P.

6. In combination, two sections A and B of railway track, track circuits for said sections including track relays $R^A$ and $R^B$ respectively, a polarized relay P, means for supplying said relay P with current of normal polarity when both of said track relays are energized, means for supplying relay P with current of reverse polarity when relay $R^A$ is energized and relay $R^B$ is de-energized, means for de-energizing relay P when relay $R^A$ is de-energized and relay $R^B$ is energized, two indication devices $L^A$ and $L^B$ for said track sections A and B respectively, means for operating device $L^A$ when relay P is de-energized, and means for operating device $L^B$ when a reverse contact of relay P is closed.

7. In combination, two sections A and B of railway track, a polarized relay P, means for supplying said relay P with current of normal polarity when sections A and B are both unoccupied, means for supplying relay P with current of reverse polarity when section B is occupied and section A is unoccupied, means for de-energizing relay P when section A is occupied and section B is unoccupied, and indicating means for said sections controlled by said relay P.

8. In combination, two sections A and B of railway track, a polarized relay P, means for supplying said relay P with current of normal polarity when sections A and B are both unoccupied, means for supplying relay P with current of reverse polarity when section B is occupied and section A is unoccupied, means for de-energizing relay P when section A is occupied and section B is unoccupied, a slow pick-up and slow-release relay G controlled by a neutral contact of relay P, two indication devices $L^A$ and $L^B$ for said two track sections A and B respectively, a circuit for lamp $L^A$ controlled by a back contact of relay G, and a circuit for lamp $L^B$ controlled by a reverse contact of relay P.

9. In combination, two sections A and B of railway track, a polarized relay P, means for supplying said relay P with current of normal polarity when sections A and B are both unoccupied, means for supplying relay P with current of reverse polarity when section B is occupied and section A is unoccupied, means for de-energizing relay P when section A is occupied and section B is unoccupied, two indication devices $L^A$ and $L^B$ for said track sections A and B respectively, means for operating device $L^A$ when relay P is de-energized, and means for operating device $L^B$ when a reverse contact of relay P is closed.

10. In combination, two sections A and B of railway track, track circuits including track relays $R^A$ and $R^B$ for said two sections respectively, three slow-releasing relays C, D and E associated with said track relays, a circuit for relay D controlled by a front contact of relay $R^B$, a circuit for relay C controlled by a back contact $R^A$ and $R^B$ in series, a circuit for relay E controlled by a front contact of relay D and a back contact of relay R in series, a polarized relay P, means for supplying relay P with current of normal polarity when track relays $R^A$ and $R^B$ are both closed, and also when track relay $R^B$ and relay C are both closed, means for supplying relay P with current of reverse polarity when relay $R^A$ is closed and relay $R^B$ is open, and also when relay E is closed and relay $R^B$ is open, means for opening the circuit for relay P when relays $R^A$ and $R^B$ are both open and indicating means for said track sections controlled by said relay P.

11. In combination, two sections A and B of railway track, track circuits including track relays $R^A$ and $R^B$ for said two sections respectively, three slow-releasing relays C, D and E associated with said track relays, a circuit for relay D controlled by a front contact relay $R^B$, a circuit for relay C controlled by a back contact $R^A$ and $R^B$ in series, a circuit for relay E controlled by a front contact of relay D and a back contact of relay R in series, a polarized relay P, means for supplying relay P with current of normal polarity when track relays $R^A$ and $R^B$ are both closed, and also when track relay $R^B$ and relay C are both closed, means for supplying relay P with current of reverse polarity when relay $R^A$ is closed and relay $R^B$ is open, and also when relay E is closed and relay $R^B$ is open, means for opening the circuit for relay P when relays $R^A$ and $R^B$ are both open, a slow pick-up and slow-release relay G controlled by a neutral contact of relay P, two indication devices $L^A$ and $L^B$ for said two track sections A and B respectively, a circuit for lamp $L^A$ controlled by a back contact of relay G, and a circuit for lamp $L^B$ controlled by a reverse contact of relay P.

12. In combination, two sections A and B of railway track, track circuits including track relays $R^A$ and $R^B$ for said two sections respectively, three slow-releasing relays C, D and E associated with said track relays, a circuit for relay D controlled by a front contact relay $R^B$, a circuit for relay C controlled by a back contact $R^A$ and $R^B$ in series, a circuit for relay E controlled by a front contact of relay D and a back contact of relay R in series, a polarized relay P, means for supplying relay P with current of normal polarity when track relays $R^A$ and $R^B$ are both closed, and also when track relay $R^B$ and relay C are both closed, means for supplying relay P with current of reverse polarity when relay $R^A$ is closed and relay $R^B$ is open, and also when relay E is closed and relay $R^B$ is open, means for opening the circuit for relay P when relays $R^A$ and $R^B$ are both open, two indication devices $L^A$ and $L^B$ for said track sections A and B respectively, means for operating device $L^A$ when relay P is de-energized, and means for operating device $L^B$ when a reverse contact of relay P is closed.

In testimony whereof I affix my signature.

JAMES J. VANHORN.